(12) United States Patent
Rueb

(10) Patent No.: US 7,876,457 B2
(45) Date of Patent: Jan. 25, 2011

(54) LASER METROLOGY SYSTEM AND METHOD

(75) Inventor: Kurt D. Rueb, Kitchener (CA)

(73) Assignee: Nikon Metrology NV, Leuven (BE)

( * ) Notice: Subject to any disclaimer, the term of this patent is extended or adjusted under 35 U.S.C. 154(b) by 204 days.

(21) Appl. No.: 12/138,586

(22) Filed: Jun. 13, 2008

(65) Prior Publication Data

US 2008/0309949 A1  Dec. 18, 2008

Related U.S. Application Data

(60) Provisional application No. 60/934,338, filed on Jun. 13, 2007.

(51) Int. Cl.
G01B 11/14 (2006.01)
(52) U.S. Cl. ...................................... 356/614
(58) Field of Classification Search ........................ None
See application file for complete search history.

(56) References Cited

U.S. PATENT DOCUMENTS 5,894,123 A * 4/1999 Ohtomo et al. ............. 250/236
6,501,543 B2 12/2002 Hedges et al.
6,535,282 B2 3/2003 Hedges et al.

* cited by examiner

*Primary Examiner*—Tarifur Chowdhury
(74) *Attorney, Agent, or Firm*—Howard & Howard Attorneys PLLC

(57) ABSTRACT

A laser metrology system for determining a location of a target utilizes a laser projector having a laser source for projecting a laser beam. A rotating head directs the laser beam in a lateral direction. A sensor associated with the laser projector is capable of sensing the laser beam. A reflective target is configured to reflect the laser beam projector from the laser source toward the sensor in a manner indicative of the angle of the rotating head and the pulse of the laser beam to determine location of the target.

16 Claims, 2 Drawing Sheets

LASER METROLOGY SYSTEM AND METHOD

RELATED APPLICATION

This application claims priority to U.S. Provisional Patent Application Ser. No. 60/934,338 filed Jun. 13, 2007.

FIELD OF THE INVENTION

This invention relates generally to a method and apparatus for generating position-related data and orientation of a target in a three-dimensional space.

BACKGROUND OF THE INVENTION

Modern manufacturing standards demand ever-increasing dimensional accuracy in a production setting. In order to meet these modern demands, such as, for example, assembly tolerances of less than one millimeter, efforts have been made to accurately determine the location of various manufacturing components in a three-dimensional space. Various dimensional metrology apparatus systems are available that provide a method in which to determine the dimensional location of manufacturing components inside a production setting.

One such example is a product provided by Metris USA, Inc., that offers an "indoor GPS" system as disclosed, for example, in U.S. Pat. Nos. 6,501,543 and 6,535,282. This system utilizes a plurality of infrared transmitters and a plurality of intelligent receivers where 3-D data requires a base reference for either known position data of a transmitter or a fixed receiver internal to a work surface. These indoor GPS systems, particularly the receivers, have proven to be expensive and fragile requiring the construction of complex communication infrastructure with several computers, Ethernet hubs, etc. For example, the receivers provided by Arc Second, Inc. are hardwired to a computer to transmit a signal received from a base transmitter. These complex receivers are fixed to targets, the location of which is determined by the indoor GPS system. The wiring associated with the receiver has proven expensive and difficult to work with in a production environment and makes it difficult to affix the receivers to production components.

Efforts to overcome some of these problems are associated with laser scanners available from Northern Digital, Eica Geosystems and others. Laser scanners include an infrared light transmitter and a retro-reflective prism, but are limited in application. There are also camera-based systems available from Leica Geosystems and others. However, all of these systems have proven to be cost-prohibitive, and not practicable for a production environment.

Therefore, there is a continuing need for a more rugged indoor metrology system that provides the necessary accuracy of modern manufacturing standards and eliminates the problems associated with the system set forth above.

SUMMARY OF THE INVENTION

A laser metrology system for determining the location of a target, and, for example, a production environment is disclosed. A laser projector includes a laser source for projecting a laser beam to a rotating head that directs the laser beam in a lateral direction. A sensor is associated with the laser projector and communicates with a computer that controls the laser metrology system. A sensor senses the laser beam and signals the computer information regarding the laser beam. A reflective target configured to reflect the laser beam projected from the projector in a lateral direction reflects the laser beam toward the sensor in a manner indicative of an angle of the rotating head and the pulse of the laser beam. The computer subsequently determines the location of the target based upon the angle of the rotating head and the pulse of the laser beam. The use of a reflective target to reflect a transmitted laser beam toward a sensor solves the problem associated with the prior art indoor metrology systems by eliminating expensive receivers and wiring associated with the same. Furthermore, the reflective target can be placed just about anywhere inside a production environment, including upon small manufacturing apparatus and components, enabling the indoor metrology system of the present system to determine the precise accuracy of the location of these elements. The reduction of the complexity and the cost associated with the indoor metrology device of the present invention expands the potential use of metrology determination in manufacturing settings that demand a high level of dimensional accuracy.

BRIEF DESCRIPTION OF THE DRAWINGS

The above, as well as other advantages of the present invention, will become readily apparent to those skilled in the art from the following detailed description of a preferred embodiment, when considered in light of the accompanying drawings in which.

DETAILED DESCRIPTION OF A PREFERRED EMBODIMENT

Figure 1:
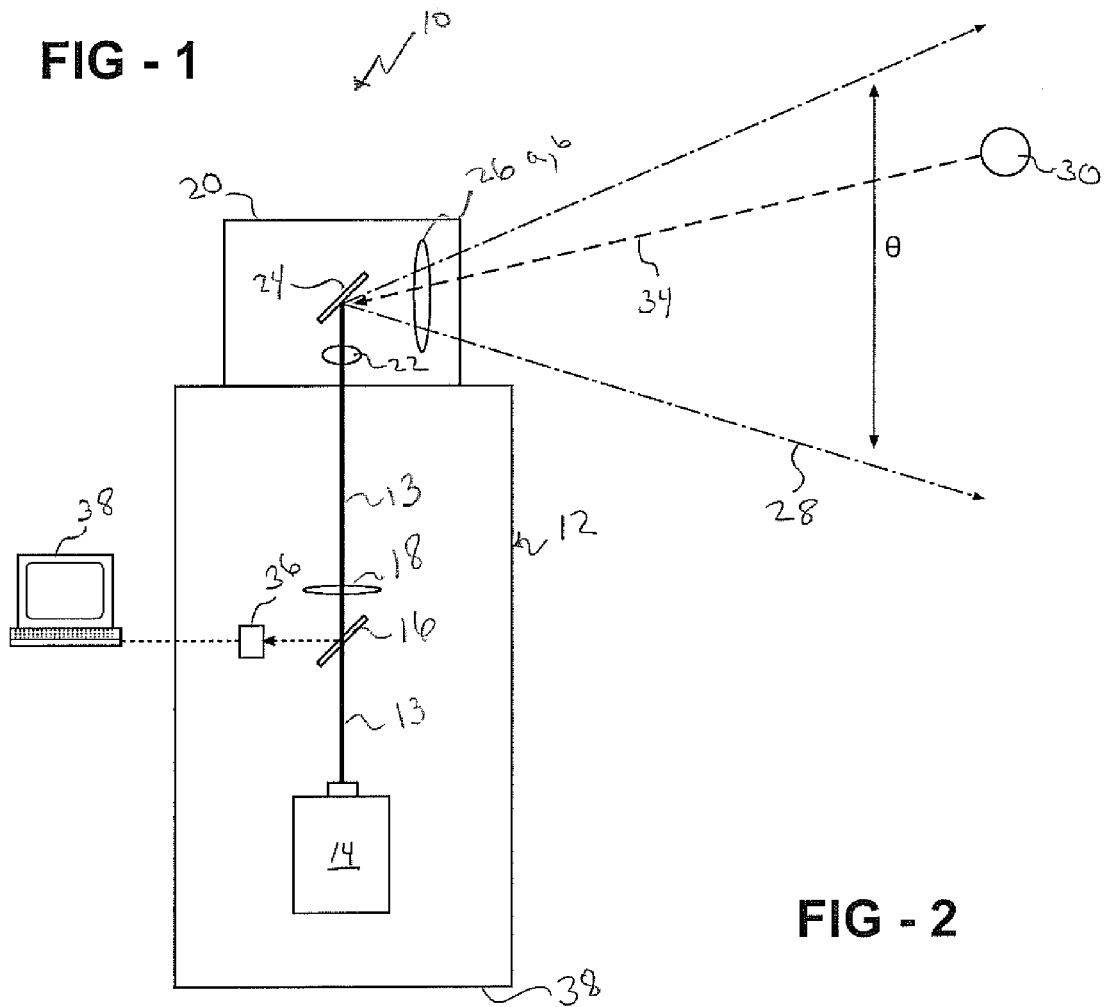
FIG. 1 is a schematic view of the metrology system of the present invention.
Figure 4:
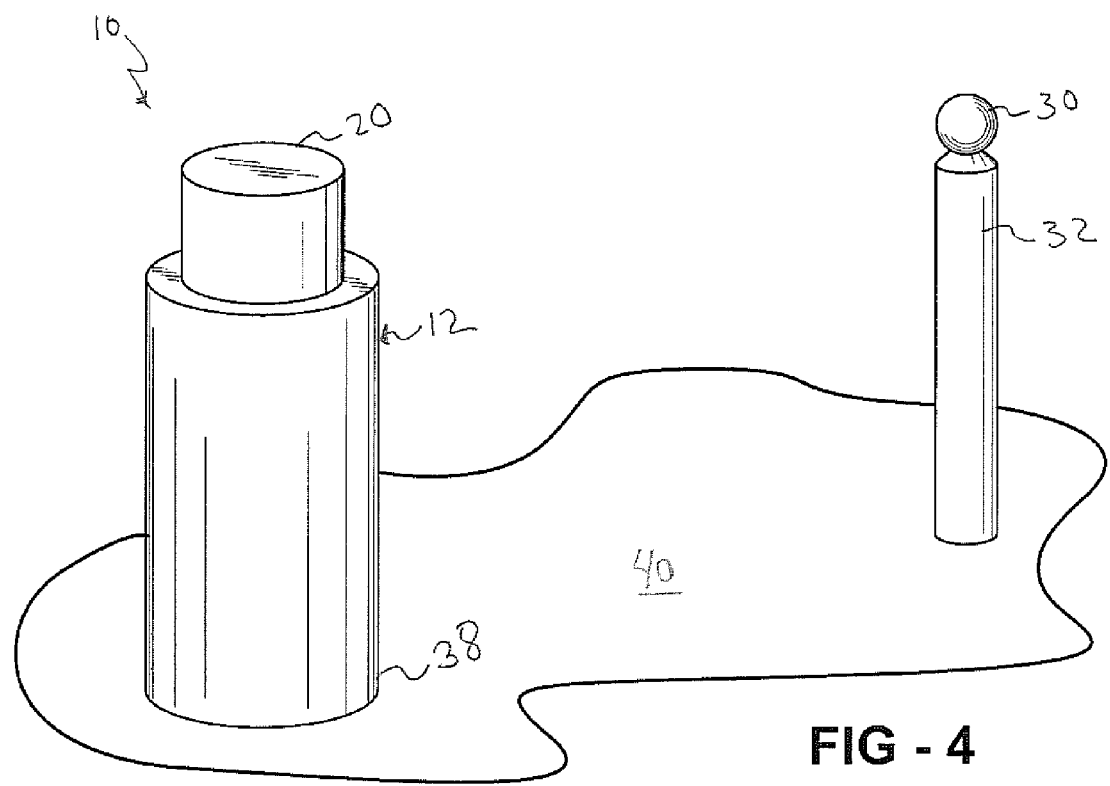
FIG. 4 is a schematic perspective view of the metrology system of the present invention.

Referring to FIGS. 1 and 4, an indoor metrology system of the present invention is generally shown at 10. A laser projector 12 includes a laser source 14 capable of producing a laser beam in a known manner. The laser source 14 projects a laser beam, preferably in a vertical direction, through a beam splitter 16, the purpose of which will be explained further below. Subsequent to passing through the beam splitter, the transmitted laser beam 13 passes through a collimator 18 in a known manner to collimate the transmitted laser beam 13.

The collimator 18 focuses the laser beam 13 into a rotating head 20 that pivots generally upon an axis defined by the laser transmitted beam 13. The transmitted laser beam 13 passes through a head lens 22 and is focused upon a mirror 24 that rotates along with the rotating head 20. In one embodiment of the present invention, the mirror 24 is oriented at an angle obtuse to the axis defined by the transmitted laser beam 13. Therefore, the mirror 24 redirects the transmitted laser beam 13 in a lateral direction to the axis defined by the transmitted laser beam 13. Because the mirror 24 rotates around the axis defined by the transmitted laser beam 13 in a 360° angle of rotation, the transmitted laser beam 13 is transmitted around a 360° lateral direction to the transmitted laser beam 13 enabling the transmitted laser beam 13 to be projected around an entire manufacturing facility.

In an alternate embodiment, the laser source 14 is located in the rotating head 20 and transmits a lateral laser beam obviating the need for a reflective mirror.

Figure 2:
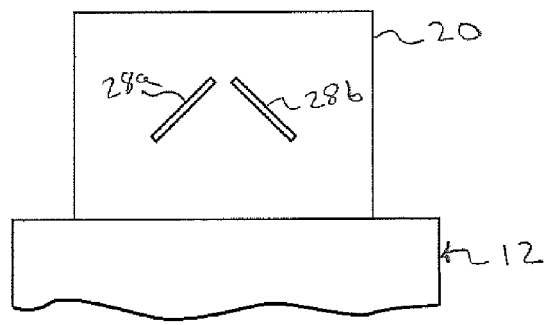
FIG. 2 is a side view of fan laser beams projected from a projector.

A cylindrical lens 26, or equivalent, is located in the rotating head 20 to reshape the transmitted laser beam 13 into a generally planar fan-shaped pattern defined by an angle theta as shown in FIG. 1. The cylindrical lense 26 rotates in a consistent manner with the mirror 24 so that the transmitted laser beam 13 is projected from the rotating head 20 in a consistent fan-shaped pattern. In one embodiment, two cylindrical lenses 26a,b, project two fan-shaped beams 28 as best represented in FIG. 2. In one embodiment, the fan-shaped beams 28a and 28b are oriented in a generally 45° degree angle to vertical, the purpose of which will be explained further below. Therefore, two fan-shaped laser beams 28a, 28b are projected from the rotating head 20 in a lateral direction around a 360° angle so that each fan-shaped laser beam 28a, 28b cover the entire production area.

Figure 3:
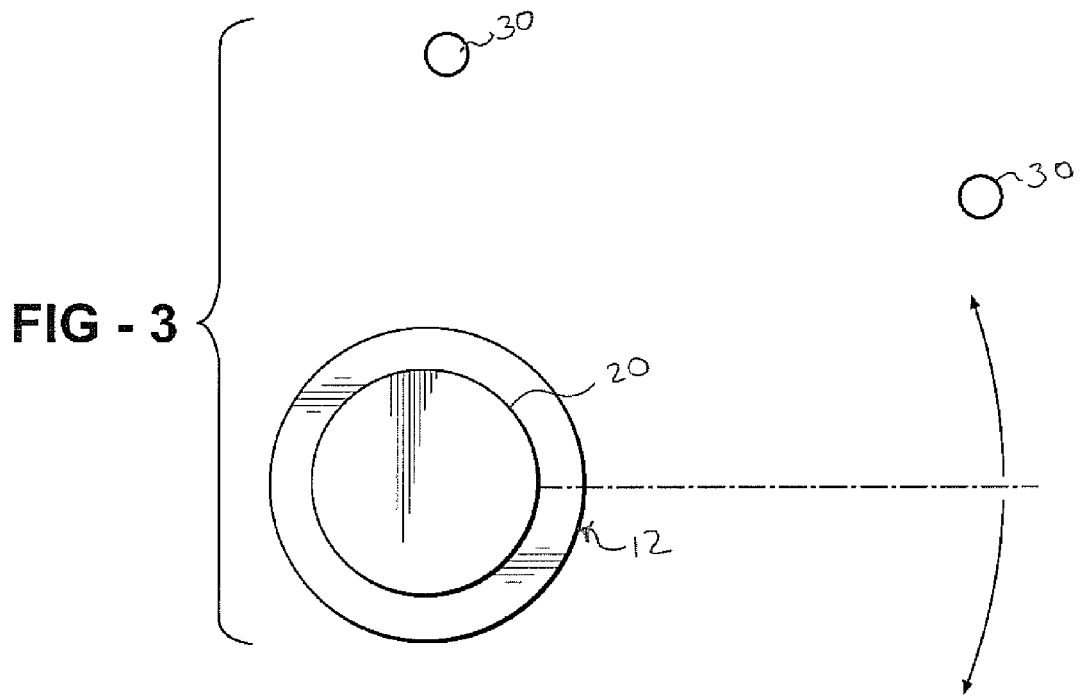
FIG. 3 is a plan view of the metrology system of the present invention.

As represented in FIGS. 1, 3 and 4, a reflector 30 otherwise known as a retro-reflector is positioned in the manufacturing setting upon a target 32. The reflector 30 is contemplated to be a spherical retro-reflector of the type manufactured by Geodesie Industrielle SA of Geneva, Switzerland. However, there are several other sources for this type of retro-reflective target. Typically, such a ball or spherical retro-reflector 30 includes microscopic glass spheres which accurately reflect a laser or light source. Specifically, the spherical retro-reflector 30 is capable of reflecting a transmitted laser beam directly back at the source of the transmitted laser beam, even at various angles of contact. The contemplated diameter of the retro-reflector 30 depends upon the application. However, testing has shown that a five millimeter radius spherical retro-reflector 30 is suitable for the desired application in a manufacturing setting.

FIG. 3 shows two retro-reflectors spaced apart in a manufacturing environment, each affixed to a target providing even further dimensional accuracy based upon triangulation. It is likely that multiple reflectors 30 will be used in any application, and be affixed to multiple assembly components and equipment to map the coordinates of a manufacturing environment in an accurate three-dimensional scale. FIG. 4 shows a reflector 30 mounted on top of a pillar target 32. However, it is contemplated that the reflectors 30 are mounted upon various assembly components including frames, airplane bodies, vehicle bodies, and equipment, such as, for example, fixtures, dies, hoists, etc.

Referring again to FIG. 1, the retro-reflective sphere 30 reflects a reflected laser beam 34 toward the rotating head 20 and into the mirror 24 of the rotating head 20. The mirror 24 reflects the reflected laser beam 34 along the axis of the transmitted laser beam 30 onto the beam splitter 16, which redirects the reflected laser beam 34 to a sensor 36. It is contemplated that the sensor 36 is located in the laser projector 12. However, in alternative embodiments, the sensor 36 is merely associated with the projector 12 and is not located inside the projector 12. The sensor 36 transmits a signal to a computer 38 that determines the three-dimensional location of the target 32 based upon the signal received from the sensor 36 as will be explained further below. The signal can be positional information about the relative position between the projector 12 and the target 30 or timing information.

The method by which the inventive laser metrology system 10 operates will now be explained. The laser source 14 generates a vertical transmitted laser beam 13 that is collimated by a collimator 18 and deflected in a lateral direction by a conventional fold mirror 24. The transmitted laser beam 13, in one embodiment, is reflected from the mirror 24 through one and possibly two cylindrical lenses 26a,b, to generate two laser beams 28 the angle of which is greater than 5°, or at an angle of between about 30° and 60° to horizontal. Furthermore, a more accurate angle, in the event that two cylindrical lenses 26a,b are used is 45° to horizontal, or one horizontal and one vertical laser beam. The fan-shaped laser beams 28 are reflected back through the lenses from the retro-reflector 30 to a sensor 36. The sensor determines the mid-point between two pulses indicating the head angle and the gap angle between the two pulses which is an indication of elevation angle as calculated by the computer 38. The angular measurement is generated based upon the relative timing of the received pulses from the targets. Therefore, the sensor 36 computes the azimuth and the elevation of the retro-reflector 30 when two cylindrical lenses are used 26a,b. Alternatively, sensor 36 computes either the azimuth or the elevation if only one cylindrical lens 26 is used. In a still further embodiment, the sensor 36 generates a time stamp upon receiving the reflected laser beam 34 (or beams when two cylindrical lenses 26a,b are used) and signals the computer 38 via a processing unit 37 so that the processing unit and computer determine the azimuth and elevation of the retro-reflector 30 to locate the target 12 in a three dimensional space.

An alternate embodiment makes use of different algorithms to determine the location of the target 12. It has been contemplated by the inventors that the location where the transmitted laser beam (or beams 28) passes over the reflector 30 creates a geometric constraint upon the actual location of the reflector 30. In consideration of the this, it is not believed to be necessary to calculate the actual elevation and azimuth angles, but the point of intersection of two cone surfaces at an expected distance of the reflector 30. In a further development of this principal each transmitted laser beam 28 is detected as a separate beam, even when generated from a single laser source 14. This eliminates the requirement of calculating the azimuth and elevation angle and enable the determination of some other geometric constraint, such as, for example, an intersection of two transmitted laser beams 28 from one or more than one projector 12 at a target 30 as reflected by the reflector 30.

When multiple retro-reflectors 30 are used, the computer determines precise location of multiple targets 32 almost simultaneously. One advantage of using the retro-reflective target 30 of the inventive metrology system 10 is that the preferred retro-reflective sphere is relative inexpensive and will only fail due to gross physical damage. No complex wiring infrastructure is required as is the case with known indoor GPS receivers. This is of particular importance in large complex metrology systems 10, which may include numerous targets 32 for some applications.

Furthermore, spherical retro-reflective targets 30 can be created with much greater mechanical accuracy than a wired electronic device and have a broad angular range of acceptance of a transmitted laser beam 13 that cannot be matched by a receiver. In the event that a retro-reflective sphere 30 needs to be replaced, no calibration is necessary. Still further, the inventive metrology system 10 does not require a strobe pulse to calibrate a receiver because the retro-reflective target 30 also serves as a transmitter and thus is in calibration with its own rotating timing. Furthermore, the laser metrology system 10 of this invention does not require different rotation rates between the transmitter and receiver requiring complex tracking algorithms to identify periodic pulses because the retro-reflectors 30 only return a signal to the sending transmitter and no other signal. Still further, the laser metrology system 10 of this invention eliminates multi-bounce problems experienced with other metrology systems because the retro-reflective path must pass through the reflecting surface in both directions. More specifically, with sufficient concentration of the first surface to impact the retro-material and then transfer enough of the returning reflection back to reflective surface to the projector 12.

As will be understood by those skilled in the art, various modifications may be made to the laser metrology system 10 and method of this invention within the purview of the appended claims. In one alternate embodiment, the projector 12 is affixed to a stationary base 38, which in the disclosed embodiment, includes the laser and is mounted on a work floor 40 at a known, predetermined location. The laser metrology system 10 is then utilized to determine the precise location of the retro-reflector 30, and therefore the target by triangulation. As set forth above, the system 10 includes a rotating head 20 having at least one, and more preferably two angularly related rotating lenses 26a,b, which generate a pair of angularly related fan-shaped laser beams 28. The beams 28 are contemplated to be planar in the disclosed embodiment and reflected back to the rotating head by the retro-reflector 30. The mid-point between the two pulses, or fan-shaped laser beams indicates the head angle and a gap between the two pulses, which is indicative of the elevational angle. Alternatively, the laser components, including the laser source 14, the sensor 36, the lens 26a,b, and associated electronics can be positioned in the rotating head 20. This results in a stable mechanical configuration which eliminates issues regarding changes in alignment between the laser source and the rotating mirror in the disclosed embodiment. This also requires transferring electrical power and signals into the rotating head 20, and does require a transformer (not shown). If the laser components are located in the rotating head, a mirror is not required to redirect the transmitted laser beam 13 in a lateral direction.

Various methods can be utilized to facilitate communication between the sensor 36 and a computer 38 as best represented in FIG. 1. It is contemplated the computer algorithms are utilized to correctly classify and identify signals detected by the sensor 36 and transmitted to the computer 38. This is achieved through a number of alternatives, such as manual identification of targets 32 before cracking commences, orientation at a known starting location, which is very similar for fixed projectors, use of non-symmetric target configurations, or other approaches, such as "shuttered" targets. It is also necessary to eliminate noise returns created from shiny surfaces, although this is relatively simple since the reflective beams from alternative projectors 12 will never intersect with precision through a common point as they do with a retro-reflective sphere 30.

Although preferred embodiments of this invention have been disclosed, a worker of ordinary skill in the art would recognize that certain modifications would come within the scope of this invention. For that reason, the following claims should be studied in order to determine the true scope and content of this invention.

What is claimed is:

1. A passive laser metrology system for determining a location of a target, comprising:
    a laser projector having a laser source for projecting a laser beam and a rotating head directing the laser beam in a lateral direction,
    a sensor means associated with said laser projector determining the mid-point between two laser pulses indicating the head angle and gap angle between two laser pulses;
    a reflective target configured to reflect the laser beam projected from said laser source toward said sensor in a manner indicative of an angle of said rotating head and pulse of said laser beam thereby determining the location of the target; and
    a computer receiving a signal from said sensor means determining the precise location of said target.

2. The laser metrology system set forth in claim 1, wherein said laser projector houses said sensor.

3. The laser metrology system set forth in claim 1, wherein said laser projector includes a cylindrical lens for generating a fan shaped laser beam capable of generating a reflective signal off said reflective target indicative of a three dimensional location of said reflective target.

4. The laser metrology system set forth in claim 1, wherein said laser projector includes two cylindrical lenses for generating two fan shaped laser beams oriented at about 90 degrees and being capable of producing two a reflective signals off said reflective target indicative of a three dimensional location of said reflective target.

5. The laser metrology system set forth in claim 1, wherein said reflective target is a retro-reflective sphere.

6. The laser metrology system set forth in claim 1, wherein said laser projector includes a stationary mount disposed at a known location.

7. The laser metrology system set forth in claim 6, wherein said minor and said lens rotates through 360 degrees at a substantially constant speed.

8. The laser metrology system set forth in claim 1, wherein said laser projector includes a collimator and a mirror for directing the laser beam through a lens thereby generating the fan shaped laser beam.

9. The laser metrology system set forth in claim 1, wherein said laser source projects said laser beam along a vertical axis through a collimator to a rotating mirror thereby redirecting said laser beam in a direction lateral to said vertical axis.

10. The laser metrology system set forth in claim 1, wherein said projector includes a beam splitter for redirecting a signal received from said reflective target toward said sensor.

11. A passive laser metrology system for determining the position of a target, comprising:
    a laser projector including a laser source and two cylindrical lenses for generating two fan-shaped beams oriented at about 90 degrees, sensor and rotating head directing transmitted laser beams laterally; and
    a retro-reflective target reflecting said transmitted laser beams to said sensor indicative of a three-dimensional location of said target.

12. The laser metrology system as defined in claim 11, wherein said retro-reflective target is a retro-reflective sphere.

13. The laser metrology system as defined in claim 11, wherein said laser projector includes a stationary base at a predetermined known location including a laser, collimator and sensor, and a rotating head including a minor and said lenses which rotate through 360 degrees at a substantially constant speed.

14. The laser metrology system as defined in claim 11, wherein said laser projects a transmitted laser beam upwardly in a vertical axis through a collimator to a rotating minor and said mirror reflects said laser beam generally horizontally.

15. A passive laser metrology system for determining a location of a target, comprising:
    a laser projector having a laser source for projecting a laser beam and a rotating head including two cylindrical lenses directing the laser beam in a lateral direction for generating two fan-shaped laser beams oriented about 90 degrees,
    a sensor associated with said laser projector and being capable of sensing the laser beams;
    a reflective target configured to reflect projected beam from said laser source of a three-dimensional location of said target toward said sensor in a manner indicative of an angle of said rotating head and pulse of said laser beams, thereby determining the location of the target.

16. The laser metrology system set forth in claim 15, wherein said sensor communicates with a computer programmed to determine said three-dimensional location of the target from a signal received from said sensor.

* * * * *

UNITED STATES PATENT AND TRADEMARK OFFICE
CERTIFICATE OF CORRECTION

| | | |
|---|---|---|
| PATENT NO. | : 7,876,457 B2 | Page 1 of 1 |
| APPLICATION NO. | : 12/138586 | |
| DATED | : January 25, 2011 | |
| INVENTOR(S) | : Kurt D. Rueb | |

It is certified that error appears in the above-identified patent and that said Letters Patent is hereby corrected as shown below:

Column 6, Claim 7, line 11, delete "said minor and said lens" and replace it with --a mirror and a lens--

Signed and Sealed this
Seventeenth Day of April, 2012

David J. Kappos
*Director of the United States Patent and Trademark Office*